United States Patent
Determan et al.

(10) Patent No.: US 11,146,328 B2
(45) Date of Patent: Oct. 12, 2021

(54) METHOD AND APPARATUS FOR AVOIDING EXCEEDING INTERFERENCE LIMITS FOR A NON-GEOSTATIONARY SATELLITE SYSTEM

(71) Applicant: QUALCOMM Incorporated, San Diego, CA (US)

(72) Inventors: James Determan, Encinitas, CA (US); Dan Vassilovski, Del Mar, CA (US); Peyman Razaghi, San Diego, CA (US); Allen Minh-Triet Tran, San Diego, CA (US); Mehmet Izzet Gurelli, San Diego, CA (US); Sumeeth Nagaraja, San Diego, CA (US); Peter John Black, San Diego, CA (US); Qiang Wu, San Diego, CA (US); Gene Wesley Marsh, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 14/865,390

(22) Filed: Sep. 25, 2015

(65) Prior Publication Data
US 2017/0019814 A1  Jan. 19, 2017

Related U.S. Application Data

(60) Provisional application No. 62/142,769, filed on Apr. 3, 2015.

(51) Int. Cl.
*H04B 7/185* (2006.01)
*H01Q 3/28* (2006.01)
(Continued)

(52) U.S. Cl.
CPC .......... *H04B 7/18515* (2013.01); *H01Q 3/28* (2013.01); *H01Q 3/34* (2013.01); *H04B 7/2041* (2013.01);
(Continued)

(58) Field of Classification Search
CPC .. H04B 7/185; H04B 7/1851; H04B 7/18513; H04B 7/18515
(Continued)

(56) References Cited

U.S. PATENT DOCUMENTS 4,965,605 A * 10/1990 Chang ..................... H01Q 3/24
343/700 MS
5,227,802 A * 7/1993 Pullman ............... H04B 7/2041
342/352

(Continued)

FOREIGN PATENT DOCUMENTS

AU        645905 B2    1/1994
CN       1328761 A    12/2001
(Continued)

OTHER PUBLICATIONS

Sharma, Shree Krishna et al. "Inline Interference Mitigation Techniques for Spectral Coexistence of GEO and NGEO Satellites. American Institute of Aeronautics and Astronautics." 2013. pp. 1-12. (Year: 2013).*
(Continued)

*Primary Examiner* — Gregory C. Issing
(74) *Attorney, Agent, or Firm* — Muncy, Geissler, Olds & Lowe, P.C.

(57) ABSTRACT

A non-geosynchronous satellite system, where each satellite has an antenna (perhaps a multi-element antenna) to form a beam pattern comprising a set of beams in the footprint of the satellite, where in one implementation each beam is substantially elliptical in shape having a minor axis and a
(Continued)

major axis, where the minor axes are substantially collinear and the major axes are substantially oriented east to west. For a satellite, power is reduced or turned off for a subset of the set of beams, wherein each beam in the subset is reduced at or below a corresponding power level such that when a beam is powered above its corresponding power level an equivalent power flux-density (EPFD) exceeds a limit at some point on the Earth's surface.

34 Claims, 15 Drawing Sheets

(51) Int. Cl.
  *H04B 7/204* (2006.01)
  *H01Q 3/34* (2006.01)
  *H01Q 1/28* (2006.01)
  *H01Q 1/36* (2006.01)
(52) U.S. Cl.
  CPC ............... *H01Q 1/288* (2013.01); *H01Q 1/36* (2013.01); *Y02D 30/70* (2020.08)
(58) Field of Classification Search
  USPC .......................................... 342/354; 455/13.4
  See application file for complete search history.

(56) References Cited

U.S. PATENT DOCUMENTS

| | | | | | |
|---|---|---|---|---|---|
| 5,355,138 | A | * | 10/1994 | Cances | H04B 7/2041 |
| | | | | | 342/352 |
| 5,541,607 | A | * | 7/1996 | Reinhardt | H01Q 3/22 |
| | | | | | 342/157 |
| 5,621,415 | A | * | 4/1997 | Tuck | H01Q 1/288 |
| | | | | | 342/354 |
| 5,845,193 | A | * | 12/1998 | Ikebe | B64G 1/1007 |
| | | | | | 244/171 |
| 5,977,907 | A | | 11/1999 | Gross | |
| 6,055,431 | A | * | 4/2000 | Dybdal | H04B 7/18515 |
| | | | | | 455/13.4 |
| 6,236,834 | B1 | * | 5/2001 | Poskett | H04B 7/18513 |
| | | | | | 455/13.1 |
| 6,272,345 | B1 | | 8/2001 | Worger et al. | |
| 6,511,020 | B2 | * | 1/2003 | Higgins | B64G 1/1007 |
| | | | | | 244/158.4 |
| 6,866,231 | B2 | | 3/2005 | Higgins | |
| 7,627,284 | B2 | | 12/2009 | Wang | |
| 8,897,769 | B2 | | 11/2014 | Miller et al. | |
| 8,929,886 | B2 | * | 1/2015 | Park | H04B 7/18539 |
| | | | | | 455/427 |
| 9,538,538 | B2 | * | 1/2017 | Zhang | H04W 72/046 |
| 9,585,150 | B2 | * | 2/2017 | Marsh | H04W 72/046 |
| 2001/0045494 | A1 | | 11/2001 | Higgins | |
| 2008/0242339 | A1 | * | 10/2008 | Anderson | H04B 7/18543 |
| | | | | | 455/522 |
| 2013/0244570 | A1 | | 9/2013 | Park | |
| 2014/0128059 | A1 | | 5/2014 | Tronc et al. | |
| 2014/0145887 | A1 | | 5/2014 | Irvine | |

FOREIGN PATENT DOCUMENTS

| | | | | |
|---|---|---|---|---|
| CN | 102316058 | A | | 1/2012 |
| CN | 103684632 | A | | 3/2014 |
| EP | 0516039 | A1 | | 12/1992 |
| JP | S61133733 | A | | 6/1986 |
| JP | H034604 | A | | 1/1991 |
| JP | 58012441 | A | * | 1/1993 ............... H04B 7/15 |
| JP | H05167487 | A | | 7/1993 |
| JP | H10150397 | A | | 6/1998 |
| WO | 9617403 | A1 | | 6/1996 |
| WO | WO-9617403 | A1 | * | 6/1996 ........... H01Q 19/192 |
| WO | 9832245 | A1 | | 7/1998 |

OTHER PUBLICATIONS

Kirtay, S. "Broadband Satellite System Technologies for Effective Use of the 12-30 GHz Radio Spectrum." Electronics and Communication Engineering Journal. Apr. 2002. pp. 1-10. (Year: 2002).*
International Search Report and Written Opinion—PCT/US2016/023922—ISA/EPO—dated Jun. 22, 2016.

* cited by examiner

METHOD AND APPARATUS FOR AVOIDING EXCEEDING INTERFERENCE LIMITS FOR A NON-GEOSTATIONARY SATELLITE SYSTEM

CROSS-REFERENCE TO RELATED APPLICATION

The present Application for Patent claims the benefit of U.S. Provisional Application No. 62/142,769, entitled "METHOD AND APPARATUS FOR AVOIDING EXCEEDING INTERFERENCE LIMITS FOR A NON-GEOSTATIONARY SATELLITE SYSTEM," filed Apr. 3, 2015, assigned to the assignee hereof, and expressly incorporated herein by reference in its entirety.

INTRODUCTION

Various aspects described herein relate to satellite communications, and more particularly, to spectral efficient data transmission among multiple user terminals by way of a satellite.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the Internet, and various public and/or private networks. A satellite is an orbiting receiver and repeater used to relay information.

A satellite can receive signals from and transmit signals to a user terminal provided the user terminal is within the footprint of the satellite. The footprint of a satellite is the geographic region on the surface of the Earth within the range of signals of the satellite. The footprint is usually geographically divided into beams, through the use of beamforming antennas. Each beam covers a particular geographic region within the footprint. The beams may be directed so that more than one beam from the same satellite covers the same specific geographic region.

Geosynchronous (more properly, geostationary) satellites have long been used for communications. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited. As alternatives to geosynchronous satellites, communication systems that utilize a constellation of satellites in non-geosynchronous orbits (NGSO), such as low-earth orbits (LEO), have been devised to provide communication coverage to the entire Earth or at least large parts of the Earth.

GSO and NGSO satellites may operate on the same (or similar) frequency bands, and therefore, NGSO satellites may employ interference mitigation techniques so that GSO satellite communications are not impaired by NGSO satellite transmissions. For example, the International Telecommunication Union (ITU) provides limits on the equivalent power flux-density (EPFD) that an NGSO satellite may produce at any point on the Earth's surface lying within the footprint of a GSO satellite.

Because calculating the EPFD at a given point on the Earth's surface is complicated, NGSO satellites typically use other techniques to meet the ITU's EPFD limits. One method of meeting the EPFD limits is for an NGSO satellite to disable a beam if, when viewed from some point in the beam's coverage area on Earth, the angle between the NGSO satellite and the GSO satellite is less than a threshold angle (e.g., which may indicate that the NGSO satellite's beam is transmitting close enough in the direction of the receiving antenna of a GSO ground station at that location so as to exceed EPFD limits). Although disabling the beam of an NGSO satellite in this manner may allow the NGSO satellite to meet the EPFD limits, this may result in unnecessary coverage gaps for the NGSO satellite communication system (e.g., when only a portion of the NGSO satellite's beam interferes with the GSO satellite's transmissions).

SUMMARY

Aspects of the claimed subject matter are directed to systems and methods for avoiding exceeding interference limits for a non-geostationary satellite system.

In an implementation, a method comprises: forming a beam pattern comprising a set of beams of an antenna of a satellite in a footprint of the satellite, each beam having a first median and a second median, each beam being narrow along its first median and wide along its second median, wherein the first medians are substantially collinear with each other and the second medians are substantially oriented east to west; and reducing power to a subset of the set of beams, wherein each beam in the subset is reduced at or below a corresponding power level such that when a beam is powered above its corresponding power level an equivalent power flux-density (EPFD) exceeds a specified limit at some point on the Earth's surface.

In an implementation, a satellite comprises: an antenna; a transponder coupled to the antenna; and a satellite controller configured to control the transponder so that the antenna forms a beam pattern comprising a set of beams in a footprint of the satellite, each beam having a first median and a second median, each beam being narrow along its first median and wide along its second median, wherein the first medians are substantially collinear with each other and the second medians are substantially oriented east to west; the satellite controller further configured to control the transponder to reduce power to a subset of the set of beams, wherein each beam in the subset is reduced at or below a corresponding power level such that when a beam is powered above its corresponding power level an equivalent power flux-density (EPFD) exceeds a specified limit at some point on the Earth's surface.

In an implementation, a satellite comprises: an antenna; means for forming a beam pattern with the antenna, wherein the beam pattern comprises a set of beams of an antenna of a satellite in a footprint of the satellite, each beam having a first median and a second median, each beam being narrow along its first median and wide along its second median, wherein the first medians are substantially collinear with each other and the second medians are substantially oriented east to west; and means for reducing power to a subset of the set of beams, wherein each beam in the subset is reduced at or below a corresponding power level such that when a beam is powered above its corresponding power level an equivalent power flux-density (EPFD) exceeds a specified limit at some point on the Earth's surface.

In an implementation, a non-transitory computer-readable media has stored instructions that when executed by a processor, the processor on board a satellite having an antenna, cause the processor to perform a method comprising: forming a beam pattern comprising a set of beams of the antenna in a footprint of the satellite, each beam having a first median and a second median, each beam being narrow along its first median and wide along its second median, wherein the first medians are substantially collinear with each other and the second medians are substantially oriented east to west; and reducing power to a subset of the set of beams, wherein each beam in the subset is reduced at or below a corresponding power level such that when a beam is powered above its corresponding power level an equivalent power flux-density (EPFD) exceeds a specified limit at some point on the Earth's surface.

DETAILED DESCRIPTION

Figure 1:
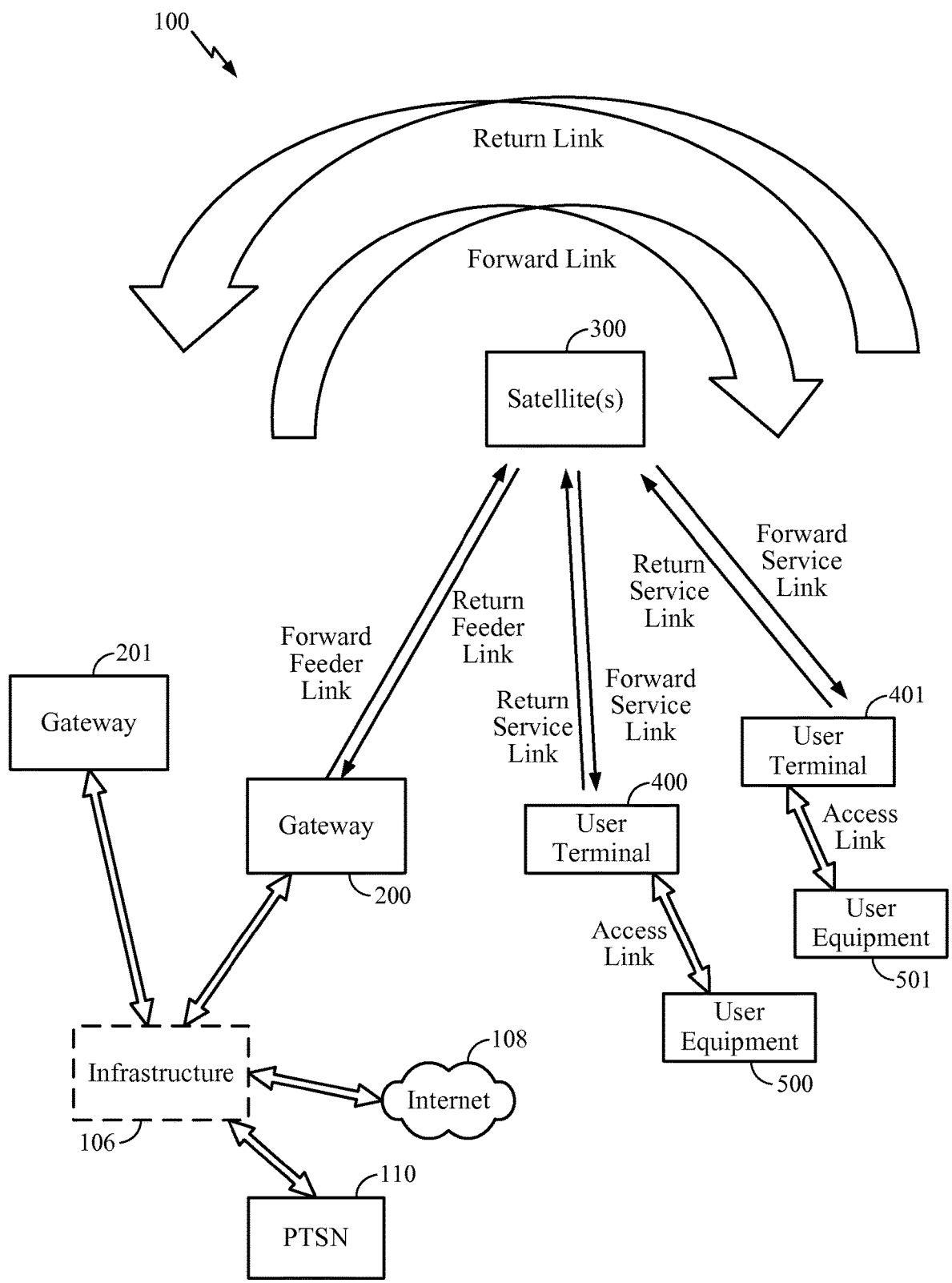
FIG. 1 is a block diagram of an example satellite communication system.

A non-geosynchronous satellite system includes satellites that adjust their beam patterns to prevent the EPFD at the Earth's surface from exceeding a specified limit. A satellite has an antenna (perhaps a multi-element antenna) to form a beam pattern comprising a set of beams in the footprint of the satellite, where in one implementation each beam is substantially elliptical in shape having a minor axis and a major axis, where the minor axes are substantially collinear and the major axes are substantially oriented east to west. For a satellite, power is reduced or turned off for a subset of the set of beams, wherein each beam in the subset is reduced at or below a corresponding power level such that when a beam is powered above its corresponding power level the EPFD an exceeds a specified limit at some point on the Earth's surface.

Aspects of the claimed subject matter are disclosed in the following description and related drawings. Alternate systems may be devised without departing from the scope of the claimed subject matter. Additionally, well-known elements will not be described in detail or will be omitted so as not to obscure the relevant details of the description.

The terminology used herein is for the purpose of describing particular aspects of the claimed subject matter only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, some aspects of the claimed subject matter are described in terms of sequences of actions to be performed by, for example, elements of a computing device. It will be recognized that various actions described herein can be performed by several entities, such as: specific circuits (e.g., application-specific integrated circuits (ASICs)); program instructions being executed by one or more processors; or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the claimed subject matter may be embodied in a number of different forms, all of which have been contemplated to be within the scope of the claimed subject matter. In addition, for each of the aspects of the claimed subject matter described herein, the corresponding form of any such aspect may be described herein as, for example, "logic configured to" perform the described action.

FIG. 1 illustrates an example of a satellite communication system 100 which includes a plurality of satellites (although only one satellite 300 is shown for clarity of illustration) in non-geosynchronous orbits (NGSO), for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate with one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to the Internet 108 or one or more other types of public, semiprivate, or private networks. In the example illustrated in FIG. 1, the gateway 200 is in communication with infrastructure 106, which is capable of accessing the Internet 108 or one or more other types of public, semiprivate, or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, the PSTN 110, or one or more other types of public, semiprivate, or private networks without using the infrastructure 106. Still further, the gateway 200 may communicate with other gateways, such as gateway 201 through the infrastructure 106 or alternatively may be configured to communicate with the gateway 201 without using the infrastructure 106. The infrastructure 106 may include, in whole or part, a network control center (NCC), a satellite control center (SCC), a wired and/or wireless core network, and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
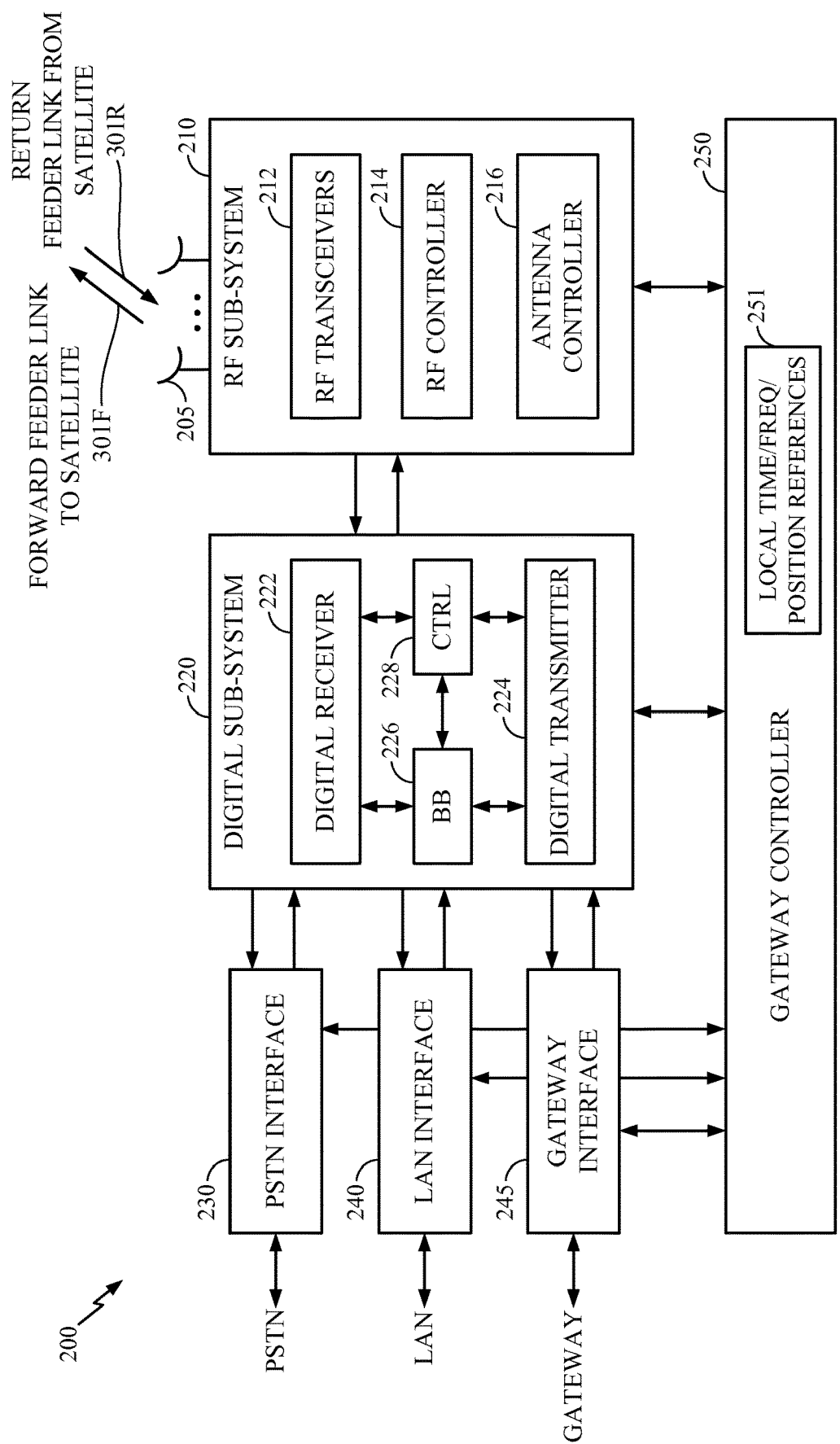
FIG. 2 is a block diagram of one example of the gateway of FIG. 1.

FIG. 2 is an example block diagram of the gateway 200, which also can apply to the gateway 201 of FIG. 1. The gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. The RF subsystem 210 is coupled to the antennas 205 and to the digital subsystem 220. The digital subsystem 220 is coupled to the PSTN interface 230, the LAN interface 240, and the gateway interface 245. The gateway controller 250 is coupled to the RF subsystem 210, the digital subsystem 220, the PSTN interface 230, the LAN interface 240, and the gateway interface 245.

The RF subsystem 210, which may include a number of RF transceivers 212, an RF controller 214, and an antenna controller 216, may transmit communication signals to a satellite (e.g., satellite 300 of FIG. 1) via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of the number of the RF transceivers 212 (e.g., selection of carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communications between a gateway and UT (e.g., gateway 200 and UT 400 of FIG. 1). One of the receive chains of the RF transceivers 212 may provide input signals to multiple digital receiver modules 222. A number of the digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The CTRL (control) processor 228, which is coupled to the digital receiver module 222, the digital transmitter module 224, and the BB (baseband) processor 226, may provide command and control signals to effect functions such as, but not limited to, signal processing, timing signal generation, power control, handoff control, diversity combining, and system interfacing.

The CTRL processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The BB processor 226 is well known in the art and is therefore not described in detail herein. For example, the BB processor 226 may include a variety of known elements such as (but not limited to) coders, data modems, and digital data switching and storage components.

The PSTN interface 230 may provide communication signals to, and receive communication signals from, an external PSTN either directly or through the infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the gateway 200 to a ground-based network (e.g., the Internet 108 of FIG. 1).

The LAN interface 240 may provide communication signals to, and receive communication signals from, an external LAN. For example, the LAN interface 240 may be coupled to the Internet 108 either directly or through the infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, the gateway interface 245 may communicate with other gateways via one or more dedicated communication lines or channels (not shown for simplicity). For other implementations, the gateway interface 245 may communicate with other gateways using the PSTN 110 and/or other networks such as the Internet 108 (see FIG. 1). For at least one implementation, the gateway interface 245 may communicate with other gateways via the infrastructure 106.

The gateway controller 250 may provide overall gateway control. The gateway controller 250 may plan and control utilization of the satellite 300's resources by the gateway 200. For example, the gateway controller 250 may analyze trends, generate traffic plans, allocate satellite resources, monitor (or track) satellite positions, and monitor the performance of the gateway 200 and/or the satellite 300. The gateway controller 250 may also be coupled to a ground-based satellite controller (not shown for simplicity) that maintains and monitors orbits of the satellite 300, relays satellite usage information to the gateway 200, tracks the positions of the satellite 300, and/or adjusts various channel settings of the satellite 300.

For the example implementation illustrated in FIG. 2, the gateway controller 250 includes local time, frequency, and position references 251, which may provide local time and frequency information to the RF subsystem 210, the digital subsystem 220, and/or the interfaces 230, 240, and 245. The time and frequency information may be used to synchronize the various components of the gateway 200 with each other and/or with the satellite 300. The local time, frequency, and position references 251 may also provide position information (e.g., ephemeris data) of the satellite 300 to the various components of the gateway 200. Further, although depicted in FIG. 2 as included within the gateway controller 250, for other implementations, the local time, frequency, and position references 251 may be a separate subsystem that is coupled to the gateway controller 250 (and/or to one or more of the digital subsystem 220 and the RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with the satellite 300, for example, to retrieve ephemeris data from the satellite 300. The gateway controller 250 may also receive processed information (e.g., from the SCC and/or the NCC) that allows the gateway controller 250 to properly aim the antennas 205 (e.g., at the satellite 300), to schedule beam transmissions, to coordinate handovers, and to perform various other well-known functions.

Figure 3:
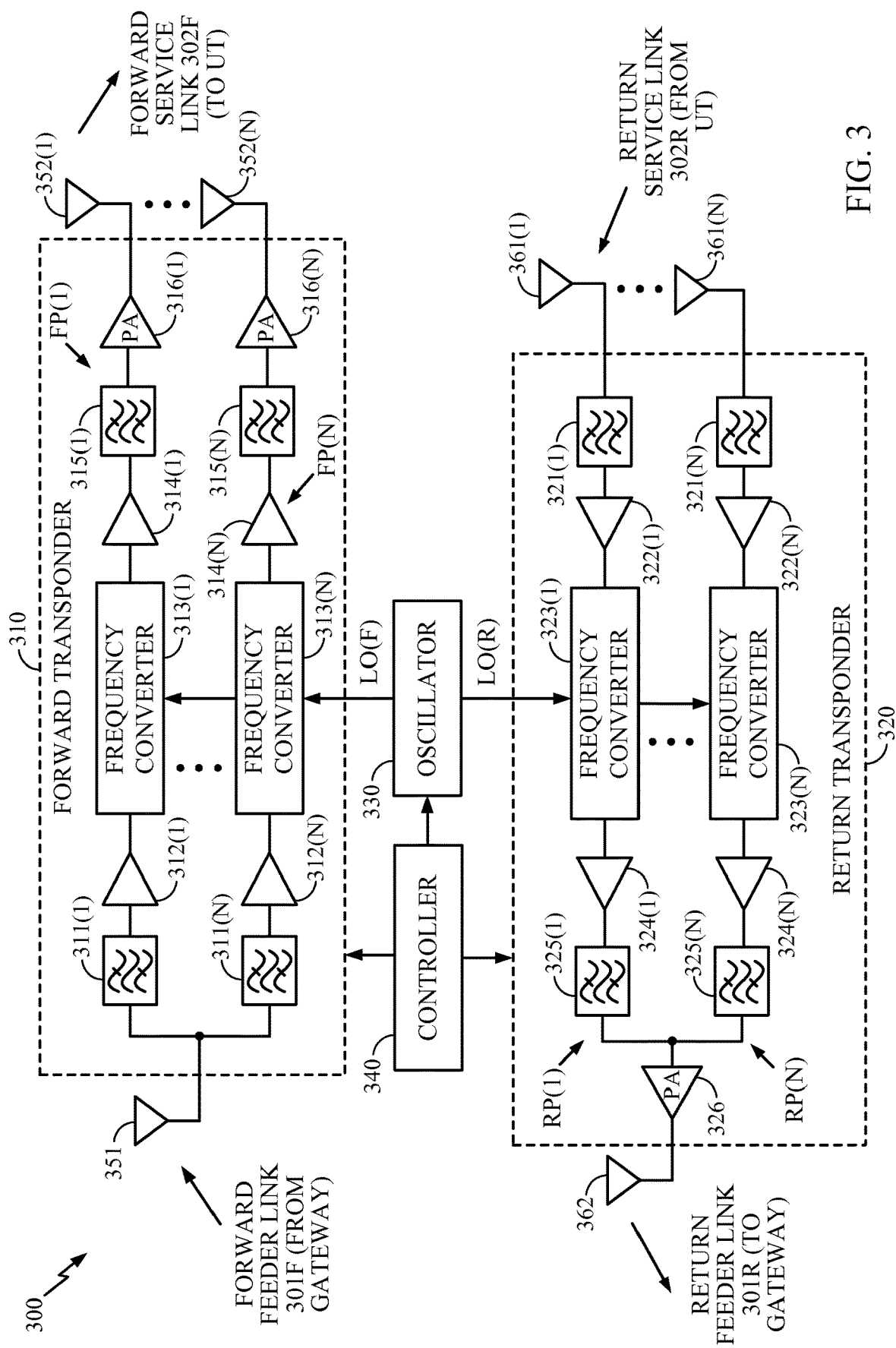
FIG. 3 is a block diagram of one example of the satellite of FIG. 1.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and the UT 400. It will be appreciated that the disclosure is not limited to any specific satellite configuration and any satellite or combinations of satellites that can provide the functional connection between the gateway 200 and the UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 361(1)-361(N) and 362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filters 311(1)-311(N), pass signal components having frequencies within the channel or frequency band of the respective forward paths FP(1)-FP(N), and filters signal components having frequencies outside the channel or frequency band of the respective forward paths FP(1)-FP(N). Thus, the pass band of the first bandpass filters 311(1)-311(N) correspond to the width of the channel associated with the respective forward paths FP(1)-FP(N). The first LNAs 312(1)-312(N) amplify the received communication signals to a level suitable for processing by the frequency converters 313(1)-313(N). The frequency converters 313(1)-313(N) convert the frequency of the communication signals in the respective forward paths FP(1)-FP(N) (e.g., to a frequency suitable for transmission from the satellite 300 to the UT 400). The second LNAs 314(1)-314(N) amplify the frequency-converted communication signals, and the second bandpass filters 315(1)-315(N) filter signal components having frequencies outside of the associated channel width. The PAs 316(1)-316(N) amplify the filtered signals to a power level suitable for transmission to the UT 400 via respective antennas 352(1)-352(N). The return transponder 320, which includes a number N of return paths RP(1)-RP(N), receives communication signals from the UT 400 along a return service link 302R via antennas 361(1)-361(N), and transmits communication signals to the gateway 200 along the return feeder link 301R via the return link antenna 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filters 321(1)-321(N) pass signal components having frequencies within the channel or frequency band of the respective return paths RP(1)-RP(N), and filters signal components having frequencies outside the channel or frequency band of the respective return paths RP(1)-RP(N). Thus, the pass band of the first bandpass filters 321(1)-321(N) may for some implementations correspond to the width of the channel associated with the respective return paths RP(1)-RP(N). The first LNAs 322(1)-322(N) amplify all the received communication signals to a level suitable for processing by the frequency converters 323(1)-323(N). The frequency converters 323(1)-323(N) convert the frequency of the communication signals in the respective return paths RP(1)-RP(N) (e.g., to a frequency suitable for transmission from the satellite 300 to the gateway 200). The second LNAs 324(1)-324(N) amplify the frequency-converted communication signals, and the second bandpass filters 325(1)-325(N) filter signal components having frequencies outside of the associated channel width. Signals from the return paths RP(1)-RP(N) are combined and provided to the return link antenna 362 via a PA 326. The PA 326 amplifies the combined signals for transmission to the gateway 200.

The oscillator 330, which may be any suitable circuit or device that generates an oscillating signal, provides a forward local oscillator LO(F) signal to the frequency converters 313(1)-313(N) of the forward transponder 310, and provides a return local oscillator LO(R) signal to the frequency converters 323(1)-323(N) of the return transponder 320. For example, the LO(F) signal may be used by the frequency converters 313(1)-313(N) to convert communication signals from a frequency band associated with the transmission of signals from the gateway 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the gateway 200.

The controller 340, which is coupled to the forward transponder 310, the return transponder 320, and the oscillator 330, may control various operations of the satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein.

Figure 4:
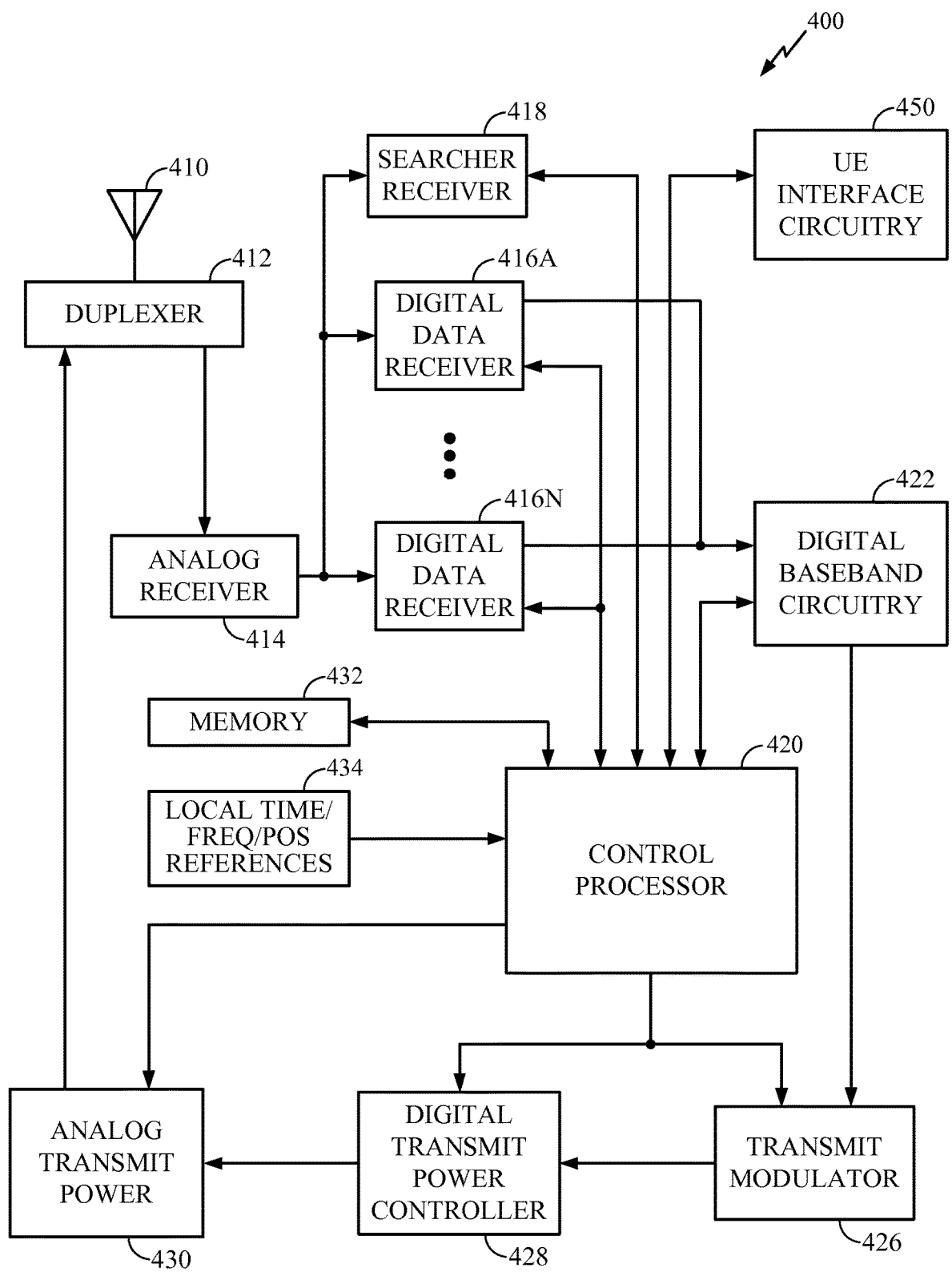
FIG. 4 is a block diagram of one example of the user terminal of FIG. 1.

An example of a transceiver for use in the UT 400 or the UT 401 is illustrated in FIG. 4. In FIG. 4, at least one antenna 410 is provided for receiving forward link communication signals (e.g., from the satellite 300), which are transferred to an analog receiver 414, where they are downconverted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receivers 416A-416N and at least one searcher receiver 418. Additional digital data receivers 416A-416N can be used to obtain desired levels of signal diversity, depending on the acceptable level of transceiver complexity, as would be apparent to one skilled in the relevant art.

At least one UT control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, the control processor 420.

When voice or other data is prepared as an output message or communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a digital transmit power controller 428 which provides output power control to an analog transmit power amplifier 430 for final transmission of the output signal from the antenna 410 to a satellite (e.g., satellite 300).

In FIG. 4, the UT 400 also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, the digital data receivers 416A-416N can be assigned to track the pilot signal after acquisition to accurately determine the ratio of signal chip energies to signal noise, and to formulate pilot signal strength. Therefore, the outputs of these digital data receivers 416A-416N can be monitored to determine the energy in, or frequency of, the pilot signal or other signals. These digital data receivers 416A-416N also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This, and other information related to frequency errors and frequency shifts, can be stored in the memory 432 as desired.

The control processor 420 may also be coupled to UE interface circuitry 450 to allow communications between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

Figure 5:
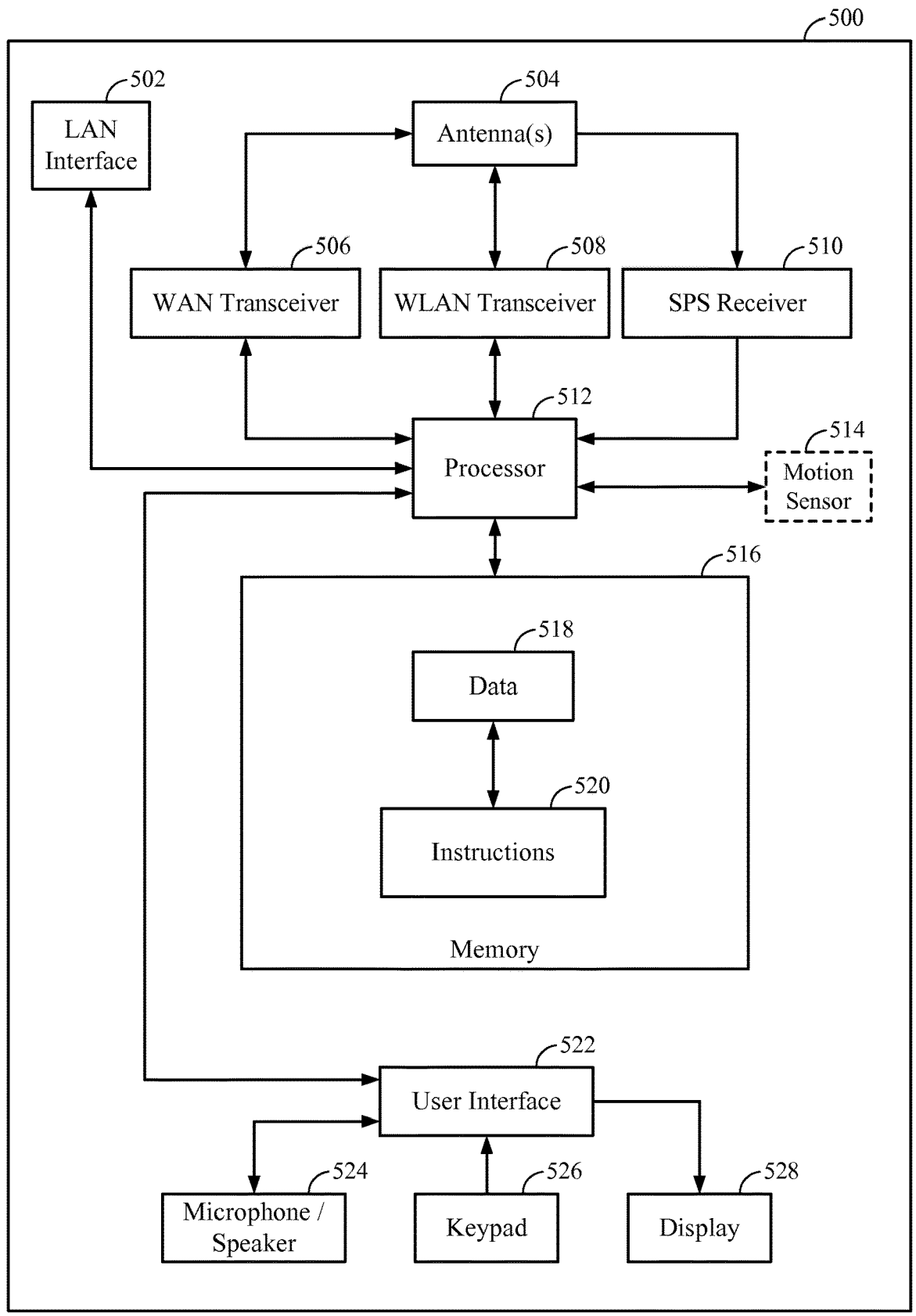
FIG. 5 is a block diagram of one example of the user equipment of FIG. 1.

FIG. 5 is a block diagram illustrating the UE 500, which also can be applied to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with Global Positioning System (GPS), Global Navigation Satellite System (GLONASS) and/or any other global or regional satellite based positioning system. In an alternate aspect, the UE 500 may include the WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508, and the SPS receiver 510. Optionally, a motion sensor 514 and/or other sensors may also be coupled to the processor 512.

A memory 516 is connected to the processor 512. In one aspect, the memory 516 may include data 518 that may be transmitted to and/or received from the UT 400, as shown in FIG. 1. Referring to FIG. 5, the memory 516 may also include stored instructions 520 to be executed by the processor 512 to perform the process steps for communicating with the UT 400. Furthermore, the UE 500 may also include a user interface 522, which may include hardware and software for interfacing inputs or outputs of the processor 512 with the UE 500 through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with, but separate from, the UT 400 as illustrated in FIG. 1, for example. Alternatively, the UE 500 and the UT 400 may be integral parts of a single physical device.

Figure 6A:
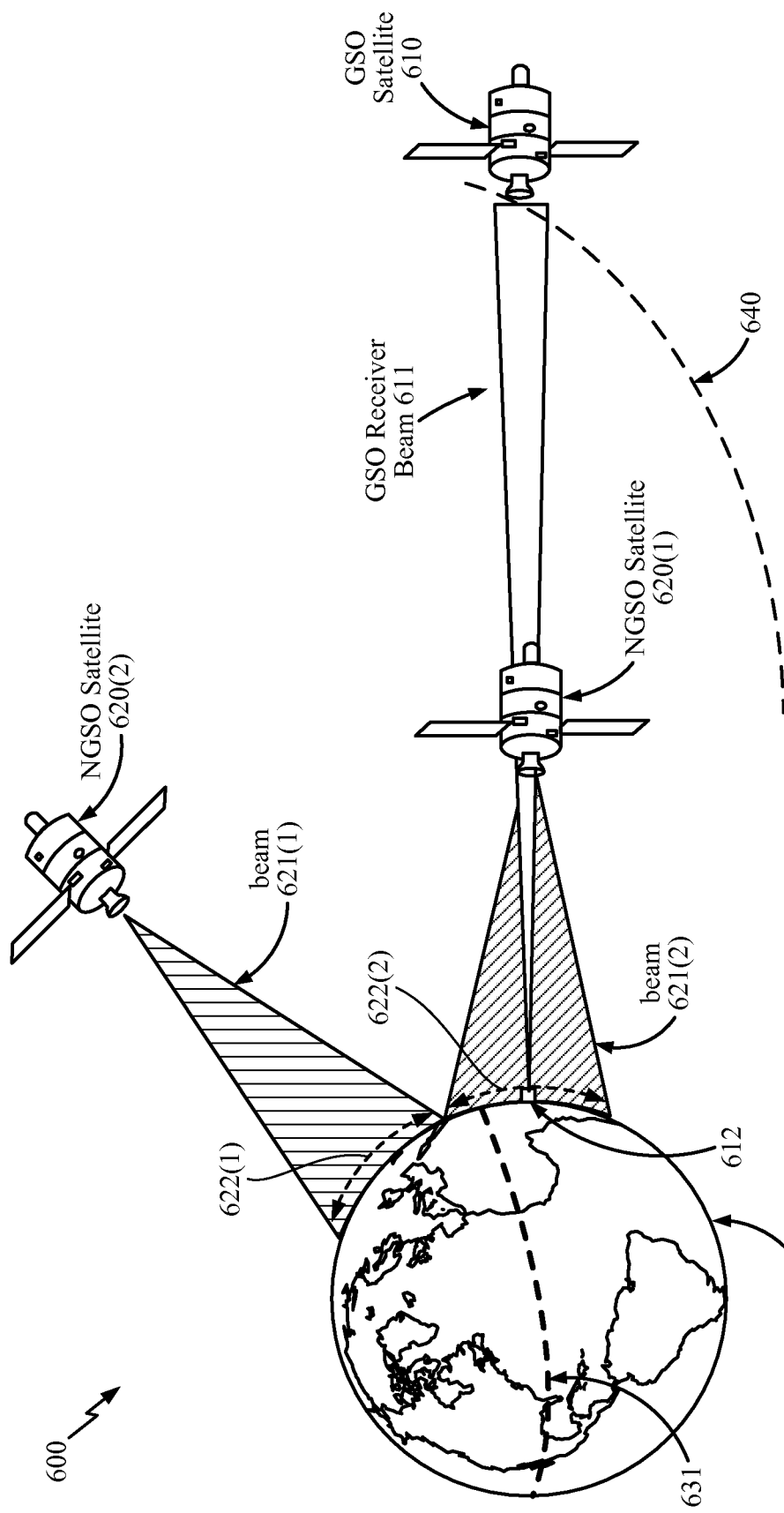
FIG. 6A is a diagram of one example of a satellite system showing a footprint.

FIG. 6A shows a diagram 600 depicting a GSO satellite 610 and two NGSO satellites 620(1)-620(2) in orbit around the Earth 630. To an observer on the Earth 630, the GSO satellite 610 appears motionless in a fixed position in the sky located (e.g., above the Earth's equator 631). The GSO satellite 610 maintains a relatively fixed line-of-sight with a corresponding GSO ground station 612. It is noted that for a given point on the surface of the Earth 630, there may be an arc of positions in the sky along which a plurality of GSO satellites are located. This arc of GSO satellite positions may be referred to herein as a GSO arc 640. The receiving direction for a GSO ground station (e.g., such as GSO ground station 612) may be defined by an antenna pattern of typically fixed orientation and fixed beam width (such as a beam width defined by an ITU specification).

The NGSO satellites 620(1)-620(2) are deployed in non-geostationary orbits and revolve around the Earth 630 along various paths above the Earth's surface at relatively low altitudes (e.g., as compared with GSO satellites). Because the NGSO satellites 620(1)-620(2) revolve around the Earth 630 relatively quickly (e.g., approximately every 90 minutes for low-earth-orbit (LEO) satellites), their positions change quickly relative to a fixed location on Earth 630. To provide coverage over a wide area of the Earth's surface (e.g., to provide Internet services across the United States), a plurality of NGSO satellites are typically deployed to form an NGSO satellite constellation, with each of the NGSO satellites providing coverage for a corresponding path across the Earth's surface. For example, the NGSO satellite 620(2) is depicted as directing beam 621(1) towards a first coverage area 622(1) on the Earth's surface, and the NGSO satellite 620(1) is depicted as directing beam 621(2) towards a second coverage area 622(2) on the Earth's surface. For actual implementations, the NGSO satellites 620(1)-620(2) may each transmit any number of beams, and one or more of the beams may be directed towards overlapping regions on the Earth's surface. As used herein, the footprint of a satellite is the surface area (on Earth) within which all UTs can communicate with the satellite (above a minimum elevation angle). The area covered by a beam transmitted (e.g., from a corresponding antenna) by the satellite is referred to herein as the beam coverage area. Thus, the footprint of a satellite may be defined by a number of beam coverage areas provided by a number of beams transmitted from the satellite.

The NGSO satellites 620(1)-620(2) may communicate with ground-based gateways (not shown in FIG. 6A for simplicity) and UTs using at least part of the same frequency spectrum used by GSO satellite 610. The NGSO satellites 620(1)-620(2) should not exceed the EPFD limits established by the ITU. A given NGSO satellite beam likely risks exceeding the EPFD limits and potentially interfering with GSO satellite communications if the given NGSO satellite and the GSO satellite 610 are substantially in the same direction when viewed from some point on the Earth's surface within the coverage area of the NGSO satellite beam, so that the NGSO satellite beam is transmitting substantially in the direction of the receiving antenna of a GSO ground station at that location, for example, as defined by the GSO ground station's beam pattern (e.g., antenna pattern).

As discussed above, the interference, at any point on the Earth's surface visible from the geostationary orbit, produced by emissions from all the space stations of a non-geostationary-satellite system must not exceed the limits described in the ITU Radio Regulations Article 22. Exceeding these limits could interfere with the operation of geostationary-satellite (GSO) Earth stations. NGSO satellites must reduce power or cease transmitting over areas of the Earth's surface where these limits would be exceeded.

For a non-geostationary-satellite system to maximize performance (including coverage and capacity) and minimize the number of NGSO satellites required to achieve the desired performance, it is desirable to minimize the portion of each satellite's coverage area where transmission power should be reduced or turned off.

Figure 6B:
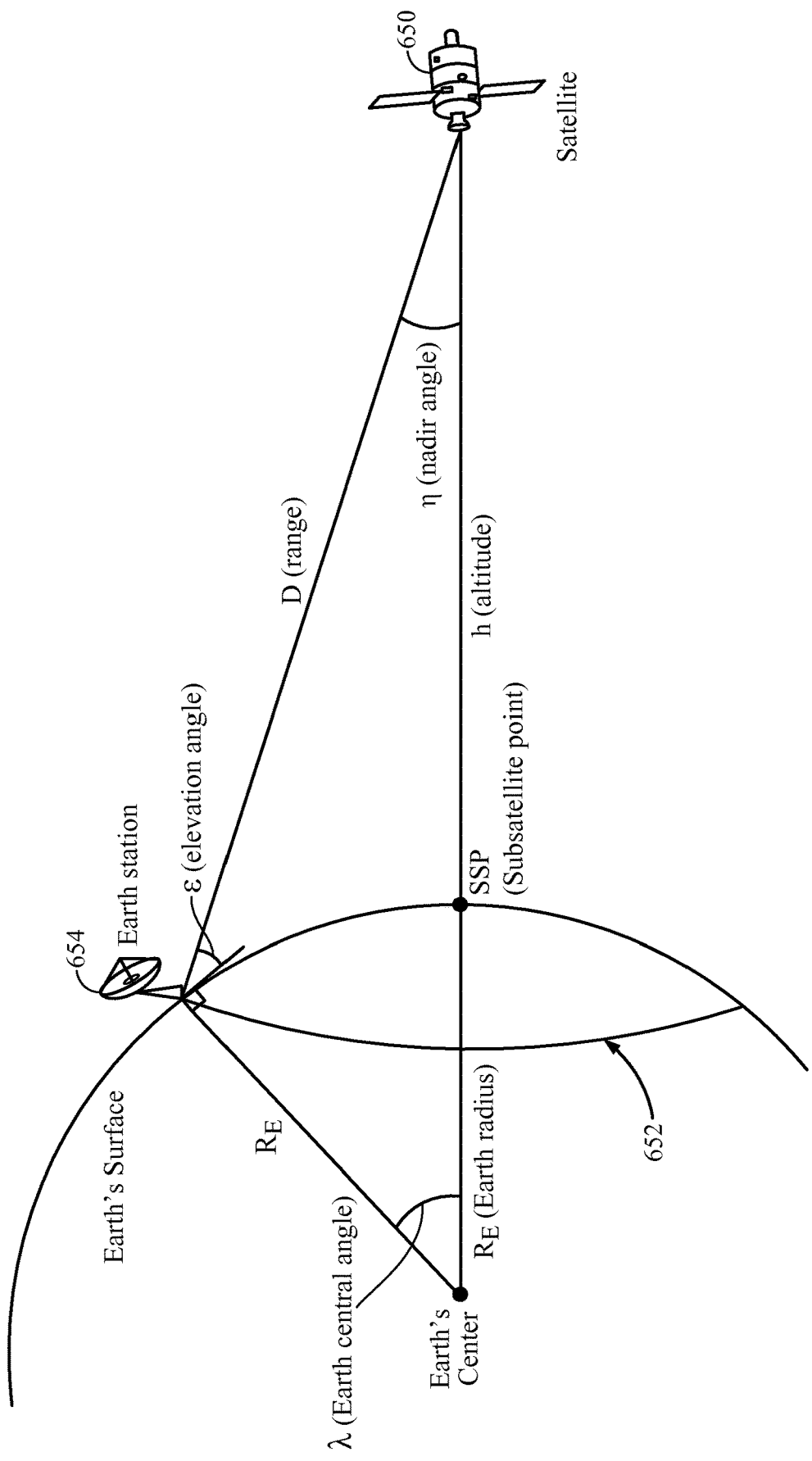
FIG. 6B is a diagram of one example of a satellite system showing relevant parameters related to a footprint.

FIG. 6B illustrates terminology associated with a footprint of an NGSO satellite 650. The footprint 652 of the NGSO satellite 650 forms a circle on the surface of the Earth defined by an Earth-central angle (shown in FIG. 6B as λ) dictated by the minimum elevation angle (shown in FIG. 6B as ε) of the Earth station 654 serving the NGSO satellite 650. Each NSGO satellite 650 provides coverage to its respective footprint 652 through the beams it transmits to the surface of the Earth from antennas mounted on the NSGO satellite 650.

In an implementation of the NGSO satellite 650, a downlink antenna beam pattern is designed as a series of long, narrow beams. The beams are oriented so that the contour of each beam on the ground (e.g. the 3 dB down contour) has its long axis (major axis) oriented east to west, and its short axis (minor axis) oriented north to south. The beams are aligned so that they are adjacent to each other in the north to south direction.

Figure 7:
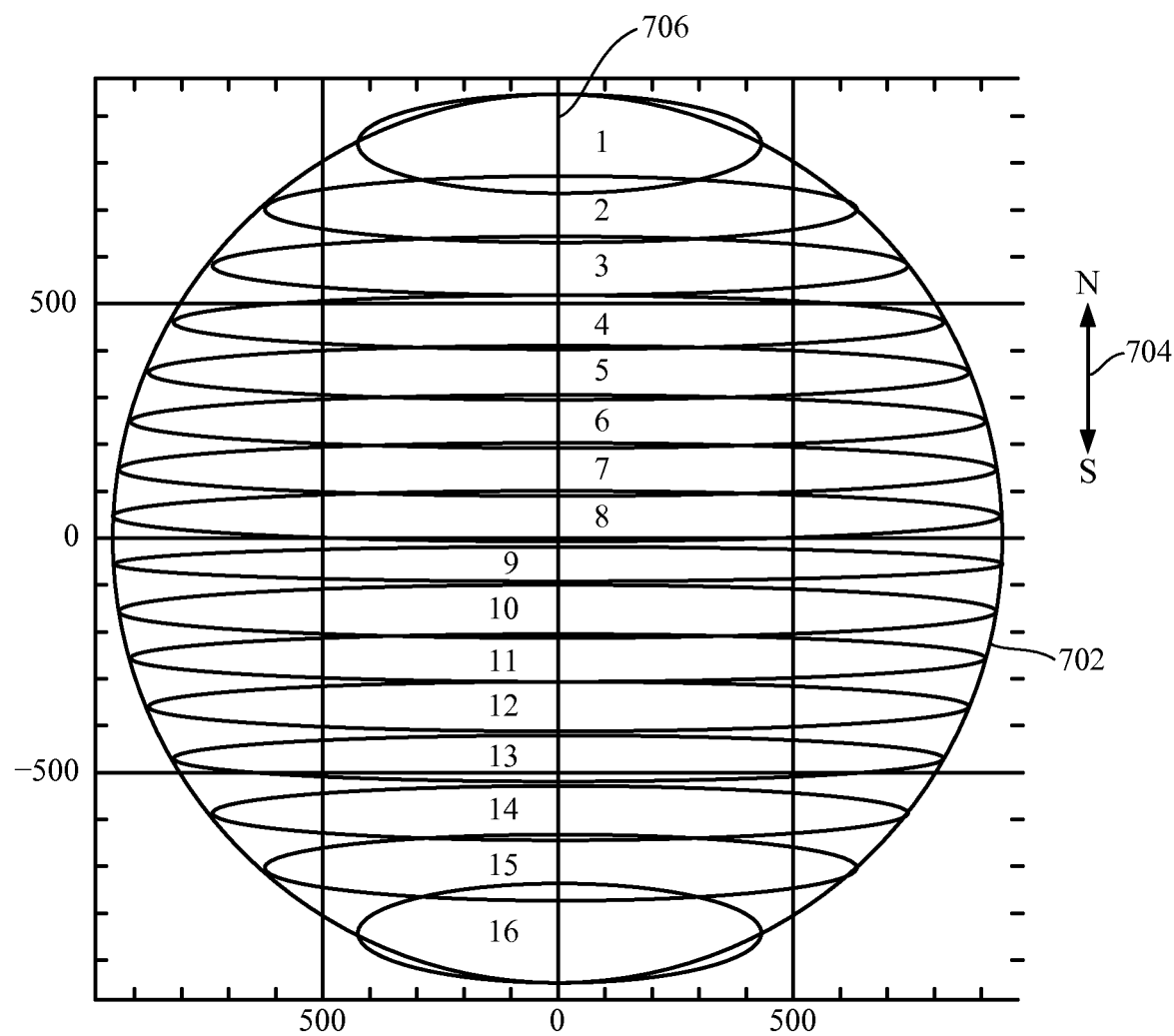
FIG. 7 is a diagram of one example of a beam pattern for a satellite.

FIG. 7 illustrates an implementation of an NGSO satellite beam pattern comprising 16 beams, where the beams are numerically labeled 1 through 16, with each beam substantially elliptical in shape and of approximately equal area. The beams are arranged to approximately cover an NGSO satellite footprint 702. The arrow 704 denotes the northern direction relative to the illustration. The minor axes of the ellipses are coincident along a single line, labeled 706, which runs north to south. The major axes of the ellipses run east to west. The overlap of any two adjacent beam patterns, if there is an overlap, is at most a relatively small fraction of the beam pattern area. The choice of 16 beams is made for ease of illustration and is not meant to be limiting, so that other implementations may have more or less than 16 beams.

For inclined satellite orbits (e.g., Walker constellations) the east to west orientation of the major axes of the satellite beams may be maintained by yaw steering of the satellites, or otherwise rotating the antenna so as to rotate the beam pattern during each orbit.

When EPFD interference limits would be exceeded for any point on the Earth in the coverage area of a beam if fully powered, the beam power shall be reduced or turned off so that the EPFD limit is not exceeded. The area where EPFD interference limits would be exceeded for a particular satellite is referred to as the GSO exclusion zone. The GSO exclusion zone forms a curved region on the Earth's surface and crosses the NGSO satellite footprint 702 in the east to west direction, but is narrow in the north to south direction.

Figure 8:
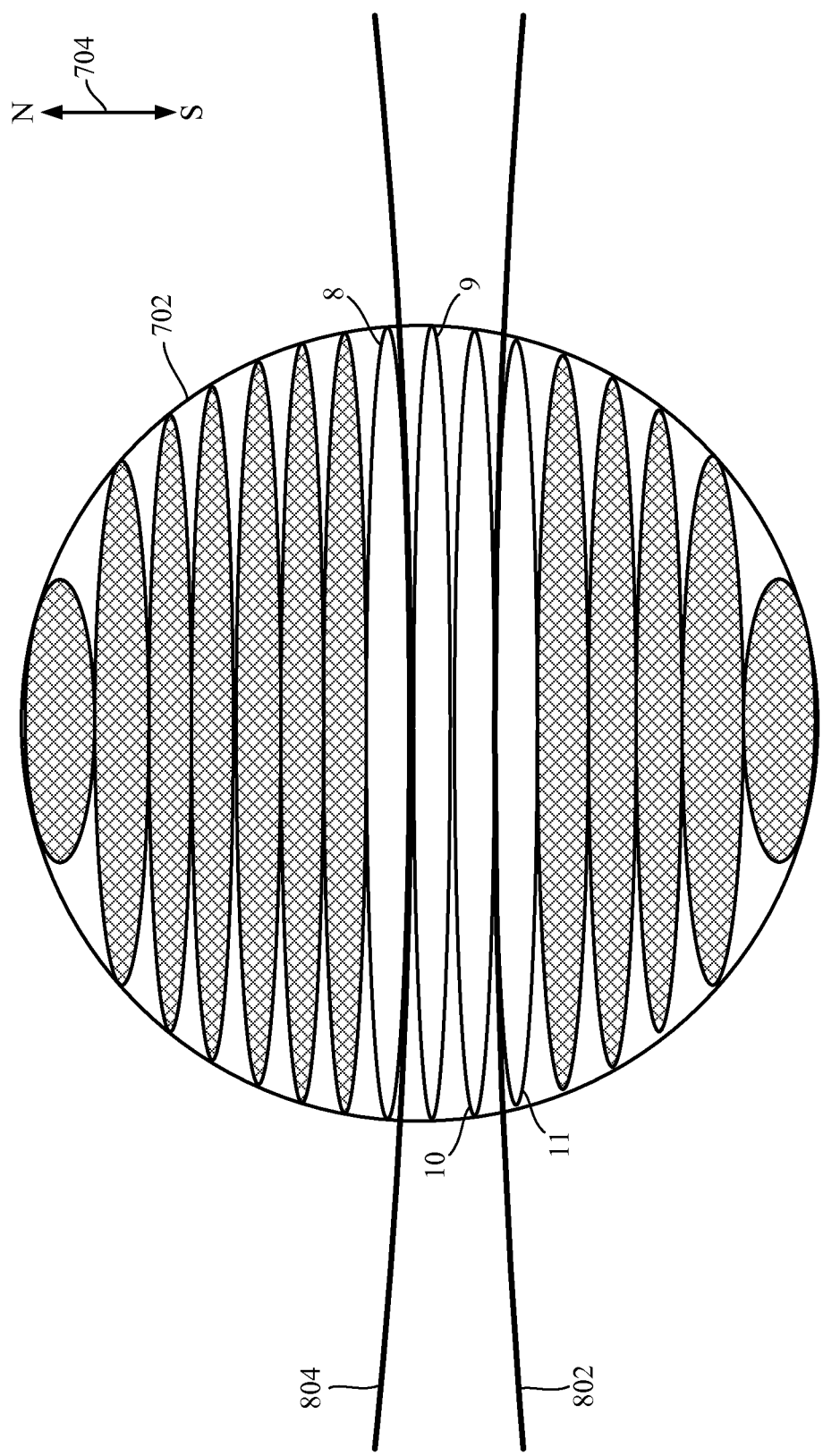
FIG. 8 is a diagram of one example of an antenna pattern with some beams in a geosynchronous orbit (GSO) exclusion zone.

FIG. 8 illustrates a GSO exclusion zone for the beam pattern illustrated in FIG. 7, where the lines 802 and 804 in FIG. 8 bound the GSO exclusion zone. For the particular example of FIG. 8, the GSO exclusion zone covers beams 9 and 10, and partly covers beams 8 and 11. Consequently, at most beams 8, 9, 10, and 11 would need to be attenuated or turned off, depending upon which beams exceed the EPFD limit. The value of the EPFD depends upon the angle of arrival above the horizontal plane as seen by an Earth station, and therefore it may vary from beam to beam. In other examples, the GSO exclusion zone may cover different beams than the ones shown in FIG. 8.

As illustrated in FIG. 8, because the beams are relatively long and narrow, and because they are oriented with their major axes running east to west along the GSO exclusion zone, the beams cover the NGSO satellite footprint 702 efficiently in the sense that relatively few beams will need to be attenuated or turned off, and a relatively small region of the NGSO satellite footprint 702 outside of the GSO exclusion zone is covered by beams which will need to be attenuated or turned off. As a result, the region covered by active beams outside of the GSO exclusion zone is a relatively large fraction of the NGSO satellite footprint 702.

The gain of the long, narrow beams is typically strongest in the center of their coverage area and gradually weakens towards the ends of the major (long) axis. Consequently, as the distance between orbit planes for NGSO satellites decreases toward higher latitudes, and the beams of NGSO satellites in adjacent orbit planes increasingly overlap, it is the weaker portion of the beams that overlap, minimizing interference, and leaving the stronger central area of the beam as the primary region of coverage.

Figure 9A:
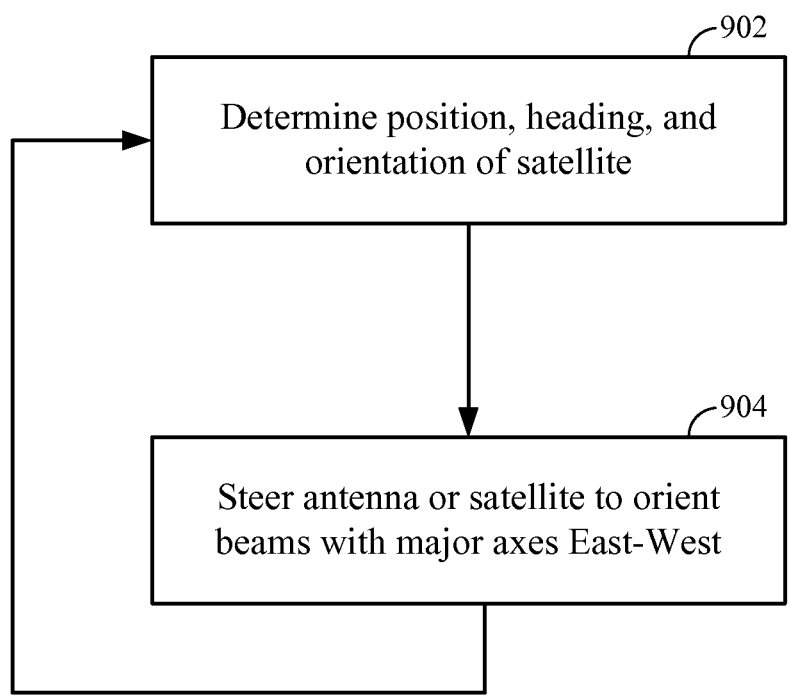
FIG. 9A is a diagram of one example of a method for beam steering for a satellite.
Figure 9B:
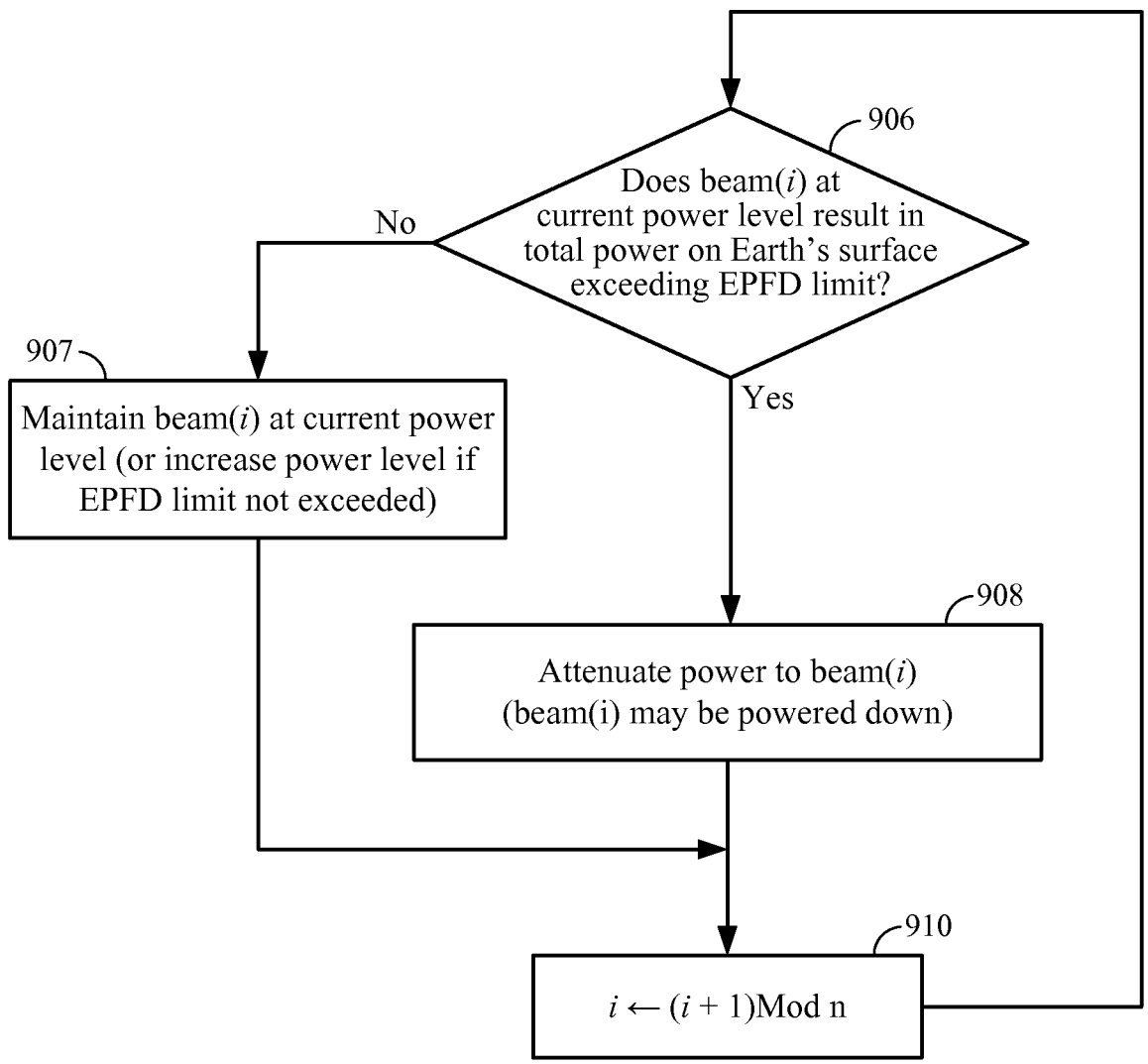
FIG. 9B is a diagram of one example of a method for attenuating or turning off a subset of a set of beams for a satellite.

An NGSO satellite may perform the methods (or processes) illustrated in FIGS. 9A and 9B. Referring to FIG. 9A, in the action 902, a determination is made of the position, heading, and orientation of the NGSO satellite. This determination may rely upon GPS measured coordinates and other sensors that provide orientation information, that is, the direction and orientation of a downlink antenna. In the action 904, an antenna or the NGSO satellite is steered to orient the beams so that their major axes lie in the east to west direction. FIG. 9A illustrates a loop from the action 904 to the action 902 to indicate that this process is a running process so that the beams have the orientation as described with respect to FIG. 7 and FIG. 8 as the NGSO satellite moves in its orbit.

FIG. 9B illustrates a method for attenuating or turning off a subset of beams in a set of beams for a satellite so that the total power due to the satellite constellation on any point of interest on the surface of the Earth does not exceed the EPFD limit. In particular, corresponding to the subset of beams is a set of corresponding power levels where each beam in the subset of beams is set at or below its corresponding power level. The set of corresponding power levels is such that if any beam in the subset of beams exceeds its corresponding power level, then the EPFD limit will be exceeded for some point of interest on the Earth's surface. There are many approaches to finding such a subset of beams and the set of corresponding power levels, where FIG. 9B provides one such example.

In the action 906 a determination is made as to whether a beam at its current power level would result in the total power at some point on the Earth's surface from all satellites in the satellite-based communication system exceeding the EPFD limit. As noted in FIG. 9B, the beams are indexed by the index i and written as "beam(i)", where the index i runs from 0 to n−1, and where n is an integer denoting the number of beams in the set of beams. If in the action 906 it is determined that the beam(i) would not cause the total power at some point on the Earth's surface to exceed the EPFD limit, then control is brought to the action 907, where the beam(i) is maintained at its current level. In some embodiments, the power level of beam(i) may be increased if doing so would not cause the EPFD limit to be exceeded. (Of course, a beam cannot be powered beyond its safe limit.) If, however, in the action 906 it is determined that the beam(i) would cause the total power at some point on the Earth's surface to exceed the EPFD limit, then control is brought to the action 908 where that particular beam is turned off or its power is attenuated. Control is then brought to the action 910.

In the action 910, the index i is incremented by 1 but wraps back to 0 when it has reached n−1. Control is then brought back to the action 906 to indicate that the process illustrated in FIG. 9B is a running process. The process in FIG. 9B may be implemented repeatedly, so that each beam is tested to see if it should be attenuated or increased in power. Note that a beam may be attenuated to the point where it is completely powered off.

It is to be appreciated that the actions of increasing and decreasing (attenuating) a beam power level as indicated in the actions 907 and 908 are performed using some step size, where the step size is an engineering design choice and can depend upon the available technology. Accordingly, the indication that the EPFD limit is exceeded if any beam in the subset of beams exceeds its corresponding power level may be interpreted to mean that the EPFD limit is exceeded when any beam in the subset of beams is a step size above its corresponding power level.

Figure 10:
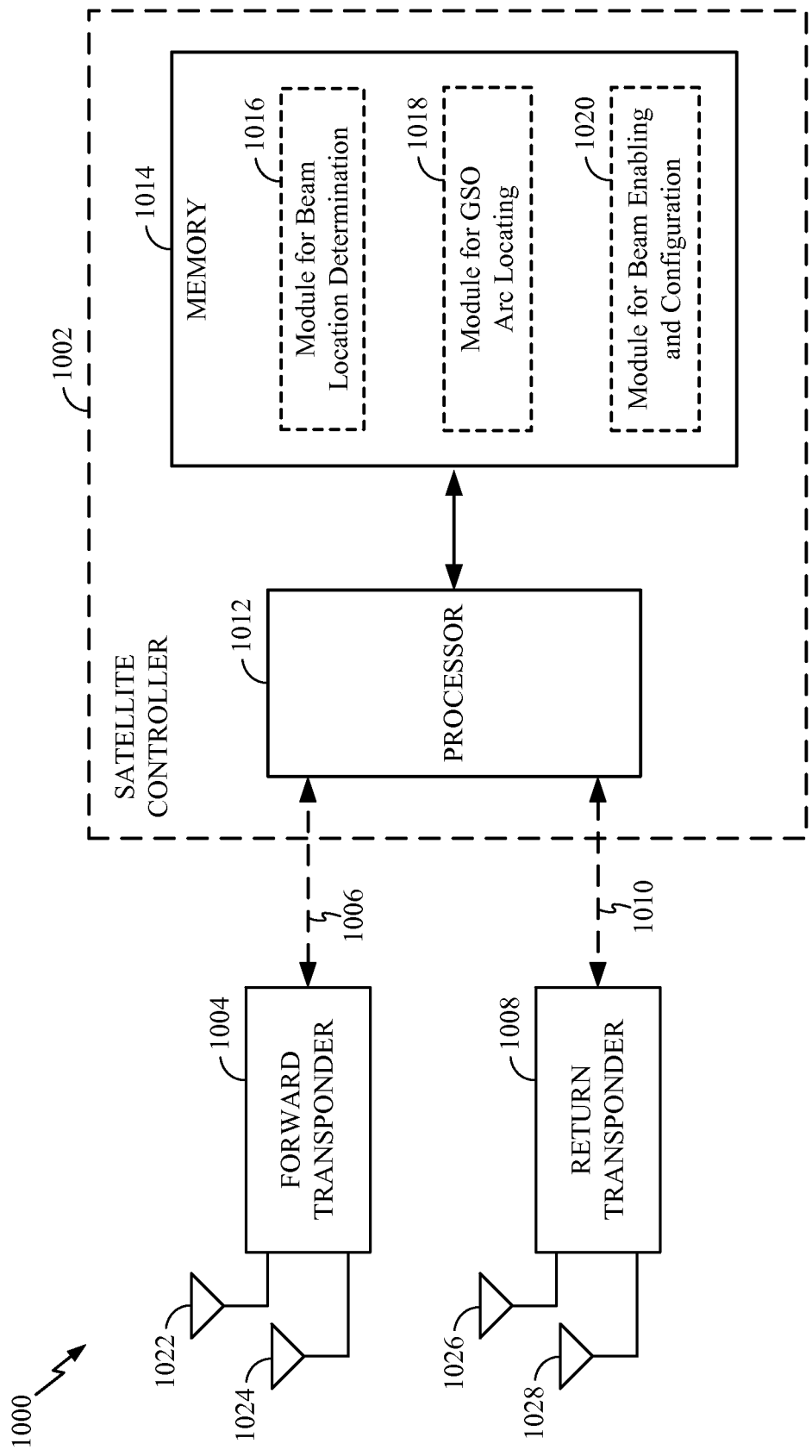
FIG. 10 is a block diagram of one example of a satellite controller to implement the methods outlined in FIGS. 9A and 9B.

FIG. 10 is a block diagram of an example satellite 1000 that includes a satellite controller 1002 for performing methods (processes) in accordance with example implementations, including those discussed with respect to FIGS. 9A and 9B. For the example of FIG. 10, the satellite controller 1002 is coupled to a forward transponder 1004 via a first link 1006 and is coupled to a return transponder 1008 via a second link 1010. For ease of illustration, not all elements in a typical satellite are shown in FIG. 10.

The satellite controller 1002 includes a processor 1012 and a memory 1014. The processor 1012 may include multiple processor cores integrated in one or more chips, and consequently reference to the processor 1012 is meant to include one or more processors. The memory 1014 may include a non-transitory computer-readable storage medium (e.g., one or more nonvolatile memory elements, such as EPROM, EEPROM, Flash memory, a hard drive, and so on) that may store the following software modules (SW): a beam location determination software module 1016 to facilitate the determination of the current location and altitude of the satellite 1000; a GSO arc locating software module 1018 to facilitate the determination of the location of the GSO arc relative to the satellite 1000; and a beam enabling and configuration software module 1020 to facilitate the enabling or disabling, or the powering up or down, of one or more beams of the satellite 1000, such as to adjust a number of parameters (e.g., antenna configurations, beam steering, antenna gain, and transmit power levels) of one or more beams of the satellite 1000, for example as described by one or more operations illustrated in FIGS. 9A and 9B.

An antenna coupled to the forward transponder 1004 is illustrated as an array of antenna elements, where for ease of illustration only two are shown, labeled 1022 and 1024. Similarly, an antenna coupled to the return transponder 1008 is illustrated as an array of antenna elements, where for ease of illustration only two are shown, labeled 1026 and 1028. The implementations discussed herein and in FIGS. 9A and 9B have been directed to the antenna coupled to the forward transponder 1004. Various types of antennas may be employed. For example, the antenna elements 1022 and 1024 may represent an electronically steerable antenna, a slotted array antenna, as well as other kinds of antennas with different kinds of polarization, such as for example right-handed polarization or left-handed polarization.

In addition, the components and functions represented by FIG. 10, as well as other components and functions described herein, may be implemented using any suitable means. Such means also may be implemented, at least in part, using corresponding structures as taught herein. For example, the components described above in conjunction with the "module for" components of FIG. 10 also may correspond to similarly designated "means for" functionality. Thus, in some aspects one or more such means may be implemented using one or more processor components, integrated circuits, or other suitable structure as taught herein.

Various modifications may be made to the disclosed implementations without departing from the claimed subject matter. For example, beams may be other than elliptical in shape, and beam patterns may be other than circular in shape. For some implementations, a square or rectangular shaped beam pattern with rectangular, oblong, or elliptically shaped beams is desirable. For example, likely realizations for satellite systems are a rectangular shaped beam pattern with rectangular shaped beams for polar satellite orbits and a circular shaped beam pattern with elliptically shaped beams for Walker or inclined satellite orbits. As other examples, the amount of overlap between beams in the beam pattern may vary, and the short (minor) axes of the beams may not be coincident along a single line.

Figure 11:
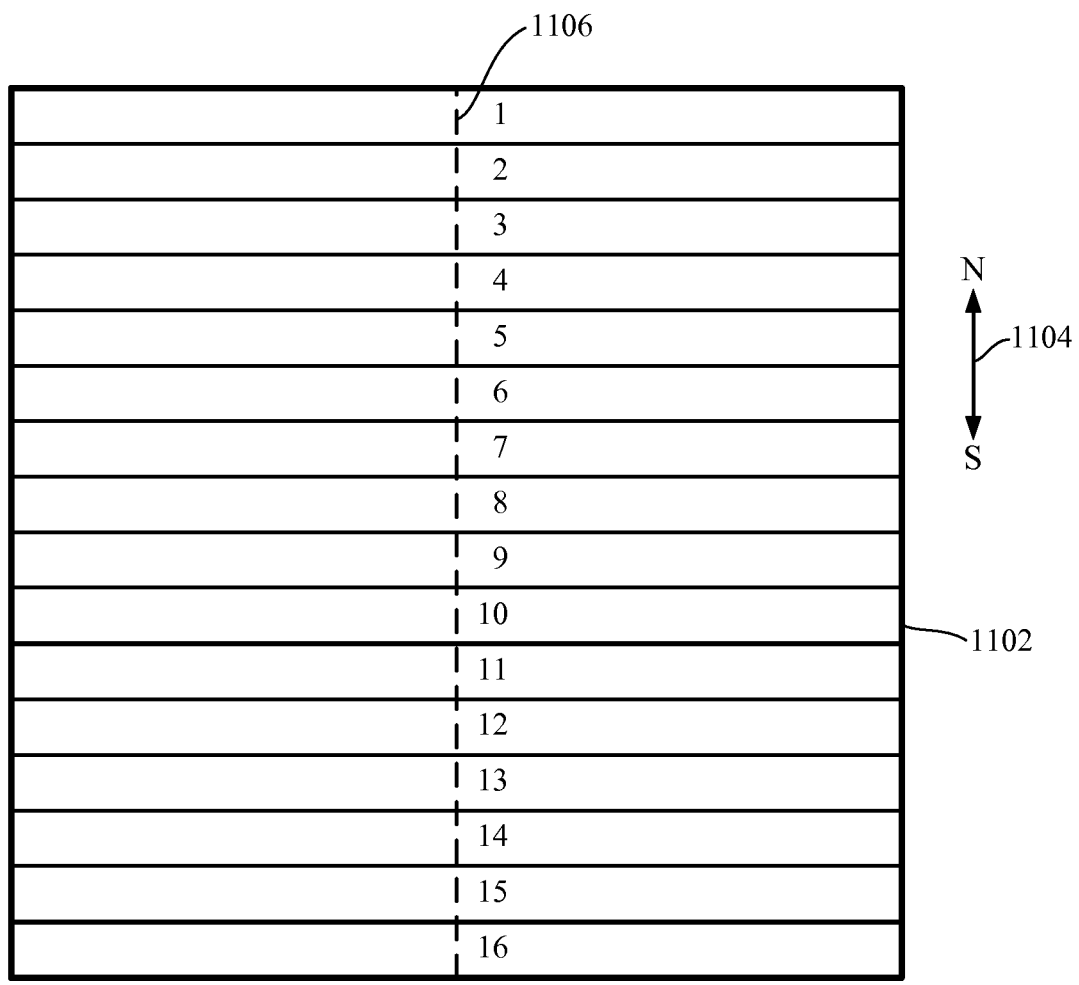
FIG. 11 is a diagram of one example of a square beam pattern with square beams for a satellite.

FIG. 11 provides a particular example of a square beam pattern with 16 beams covering a footprint 1102, but where the beams have a rectangular shape. In this case, what was termed a minor axis for an ellipse may now be referred to as a median (or midline or mid-segment) for a rectangle, although the term minor axis may still be used. More precisely, it is the smaller of the two medians of a rectangular beam that is collinear (coaxial) from one rectangular beam to another. The smaller of the two medians may be referred to as a short median. For example, a dashed line 1106 in FIG. 11 represents all the short medians of the rectangular beams lined up with each other.

Figure 12:
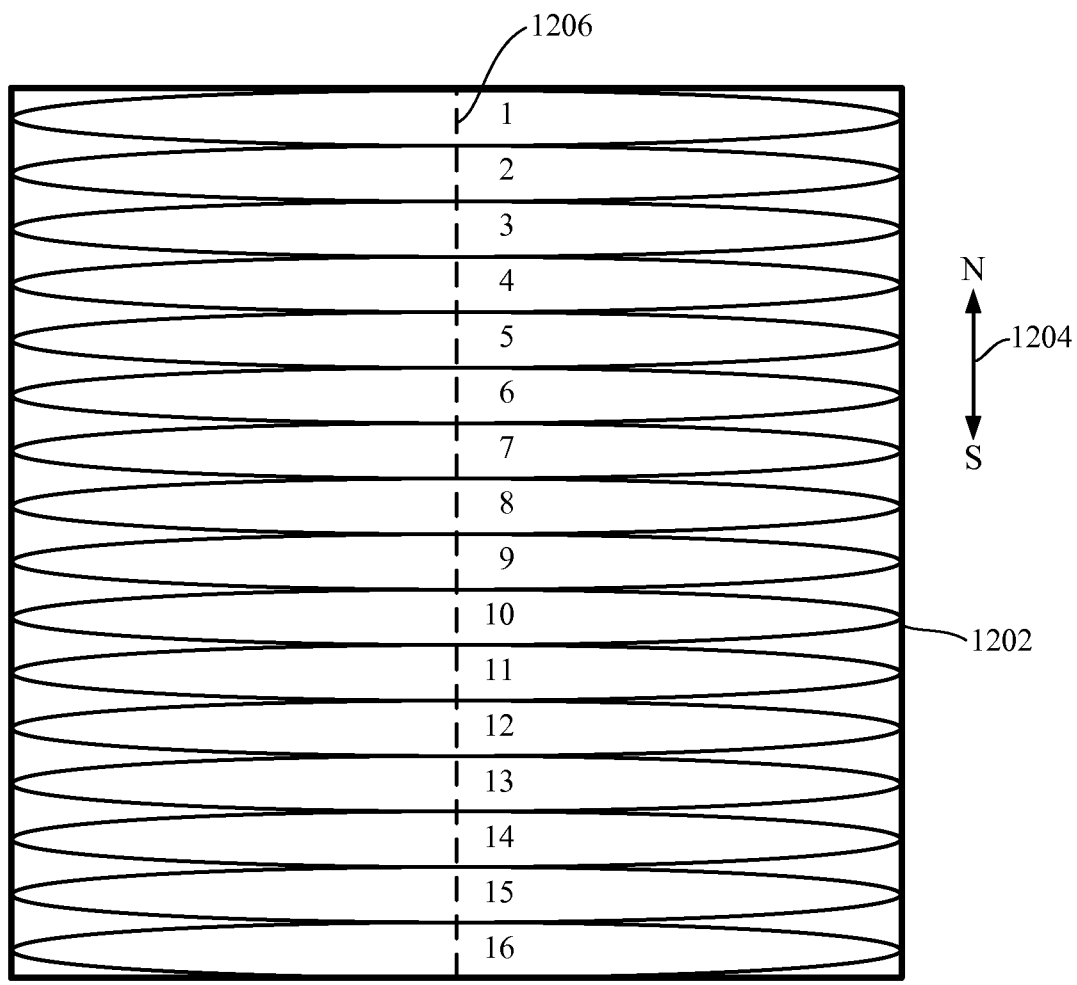
FIG. 12 is a diagram of one example of a square beam pattern with oval beams for a satellite.

FIG. 12 provides another particular example of a square beam pattern with 16 beams covering a footprint 1202, but where the beams have an elliptical or oval shape. Such a beam shape is more easily realized than the rectangular shape shown in FIG. 11, which may be considered to represent an ideal shape. A dashed line 1206 in FIG. 12 represents all the short medians of the oval beams lined up with each other.

Generally, a beam may have one of several different shapes, but in practice each beam may be described as relatively short or narrow in the north to south direction, and wide or long in the east to west direction, where the beams are substantially adjacent (contiguous) to each other when viewed looking down into the surface of the footprint. That is, their short medians are collinear, oriented in the north to south direction, it being understood that the short median of an ellipse is its minor axis.

In describing that a beam is narrow along a first median (or first direction) and wide along a second median (or second direction), it is to be understood that the linear dimension of the beam along the first median (or first direction) is less than the linear dimension of the beam along the second median (or second direction). Furthermore, because the set of beams making up a beam pattern can be oriented with at most finite precision, in describing the medians of a set of beams in a beam pattern as substantially collinear or substantially oriented in a particular direction, it is to be understood that the median of each beam in the set of beams can at most be collinear or oriented in a particular direction to within the tolerances available for the particular technology employed in an embodiment.

More generally, the term substantially when used with respect to a feature or condition of a beam is meant to convey the limitations inherent in the particular technology employed in an embodiment. For example, a beam may be described as substantially elliptical, it being understood that the shape of the beam will not exactly meet the geometric definition of an ellipse, but that the shape will be recognized by one of ordinary skill in the art as being sufficiently elliptical so that it may be modeled as an ellipse when calculating power or a communication link budget.

Figure 13:
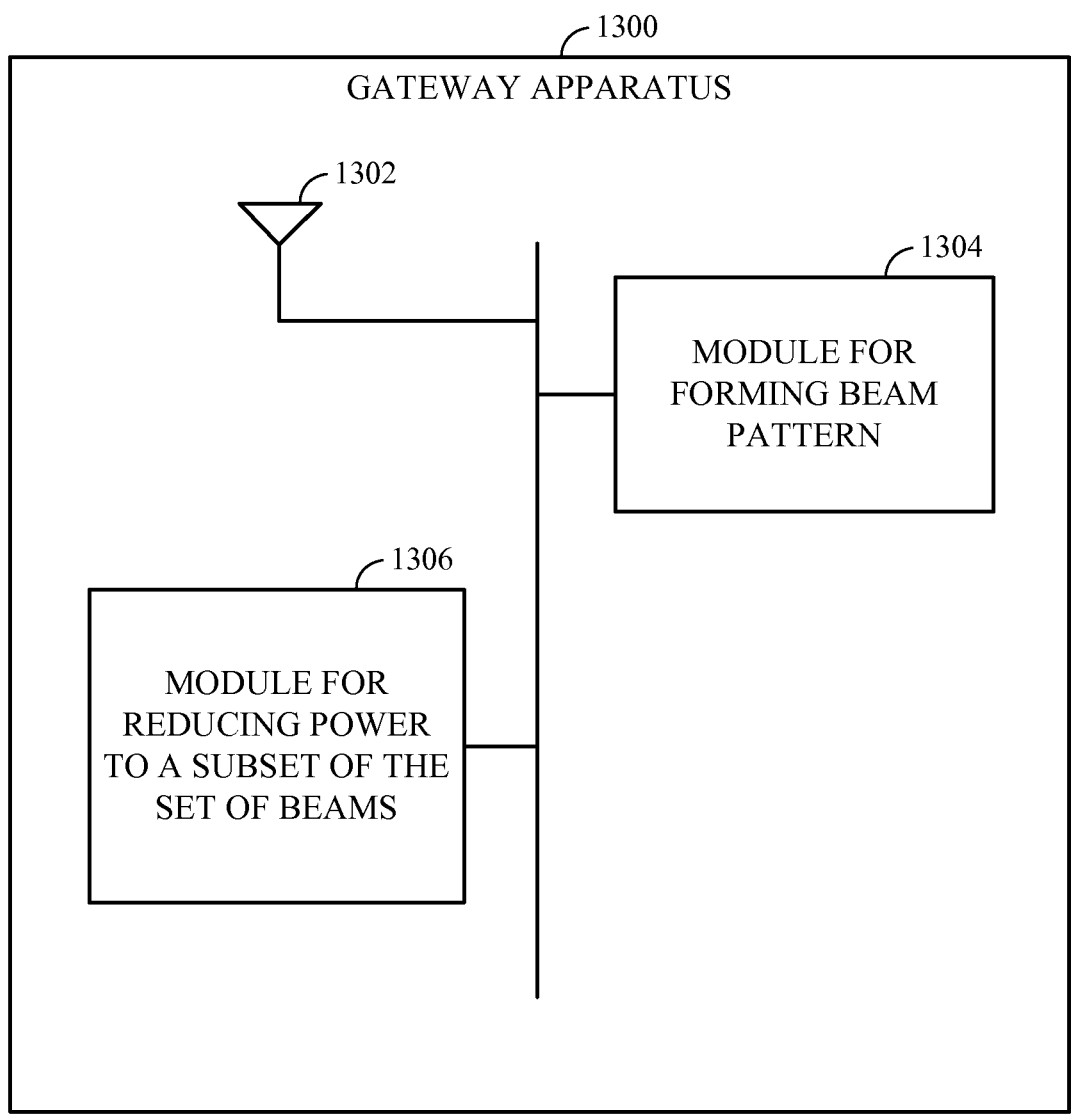
FIG. 13 is an example of a gateway with interrelated functional modules.

FIG. 13 illustrates an example gateway apparatus 1300 represented as a series of interrelated functional modules as discussed with respect to the examples of FIGS. 9A, 9B, and 10. A module for forming a beam pattern 1304 with the antenna 1302 may correspond at least in some aspects to, for example, a satellite controller or a component thereof as discussed herein (e.g., the satellite controller 1002 of FIG. 10 or the like). The module for forming a beam pattern 1304 forms a beam pattern such that for a set of beams in a footprint, each beam is narrow along its first median and wide along its second median, where the first medians are substantially collinear with each other and the second medians are substantially oriented east to west. A module for reducing (or attenuating) power to a subset of the set of beams 1306 may correspond at least in some aspects to, for example, a satellite controller or a component thereof as discussed herein (e.g., the satellite controller 1002 of FIG. 10 or the like). Each beam in the subset is reduced at or below a corresponding power level such that when a beam is powered above its corresponding power level an equivalent power flux-density (EPFD) exceeds a limit at some point on the Earth's surface.

The functionality of the modules of FIG. 13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13 as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein.

It is to be appreciated that when describing the implementations of the disclosure, a beam may be referred to as substantially elliptical, substantially rectangular, or such that the short medians are substantially collinear. One of ordinary skill in the art recognizes that substantially is a term of art reflecting the fact that antenna patterns cannot be made to fit a precise geometric definition due to the finite size of the antenna aperture and the tolerances available in the mechanical structures and in the electronic and microwave components.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, aspects of the claimed subject matter may include a computer-readable media embodying a method for avoiding exceeding interference limits for a non-geostationary satellite system. Accordingly, the claimed subject matter is not limited to illustrated examples.

While the foregoing disclosure shows illustrative aspects of the claimed subject matter, it should be noted that various changes and modifications could be made herein without departing from the scope of the invention as defined by the appended claims. The functions, steps, and/or actions of the method claims in accordance with the description herein need not be performed in any particular order. Furthermore, although aspects of the claimed subject matter may be described or claimed in the singular, the plural is contemplated unless limitation to the singular is explicitly stated.

What is claimed is:

1. A method comprising:
    forming a beam pattern comprising a set of beams of an antenna of a satellite in a footprint of the satellite, each beam having a first median and a second median, each beam being narrow along its first median and wide along its second median, wherein the first medians are substantially collinear with each other and the second medians are substantially oriented east to west, wherein the satellite is a non-geostationary satellite and is part of a non-geostationary satellite system;
    determining for each beam of the set of beams whether the beam at a current power level would result in a total power from the satellite at a geosynchronous orbit (GSO) exclusion zone on the Earth's surface to exceed an equivalent power flux density (EPFD) limit specified in relation to a geostationary satellite, wherein the determining uses predetermined limits based on a current location of the satellite in a non-geosynchronous orbit (NGSO) and the beam pattern of the satellite; and
    for each beam, adjusting the current power level of the beam based on the determination, wherein the adjusting the current power level of the beam comprises:
        attenuating the current power level of the beam when the total power exceeds the EPFD limit as an angle of transmission of the beam approaches a direction of transmission of the geostationary-satellite;
        or
        increasing the current power level of the beam as the angle of transmission of the beam recedes from the direction of transmission of the geostationary satellite to a point of maximum power level that does not cause the total power to exceed the EPFD limit when the total power is below the EPFD limit.

2. The method of claim 1, wherein the EPFD limit is specified by the International Telecommunication Union (ITU) to prevent causing unacceptable interference to geostationary-satellite networks.

3. The method of claim 1, wherein the antenna is an electronically steerable antenna.

4. The method of claim 1, wherein the forming maintains the east to west orientation during orbit of the satellite by yaw steering the satellite.

5. The method of claim 1, wherein the forming maintains the east to west orientation during orbit of the satellite by rotating the antenna.

6. The method of claim 1, wherein each beam has substantially the same area.

7. The method of claim 1, wherein each beam is substantially elliptical in shape, wherein the first median of each beam is its minor axis and the second median of each beam is its major axis.

8. The method of claim 1, wherein each beam is substantially rectangular in shape.

9. The method of claim 1, wherein the adjusting adjusts the power to each beam in step-size increments.

10. The method of claim 1, wherein the (GSO) exclusion zone includes a ground station of the geostationary satellite.

11. A satellite comprising:
    an antenna;
    a transponder coupled to the antenna; and
    a satellite controller configured to:
        control the transponder so that the antenna forms a beam pattern comprising a set of beams in a footprint of the satellite, each beam having a first median and a second median, each beam being narrow along its first median and wide along its second median, wherein the first medians are substantially collinear with each other and the second medians are substantially oriented east to west wherein the satellite is a non-geostationary satellite and is part of a non-geostationary satellite system;
        determine for each beam of the set of beams whether the beam at a current power level would result in a total power from the satellite at a geosynchronous orbit (GSO) exclusion zone on the Earth's surface to exceed an equivalent power flux density (EPFD) limit specified in relation to a geostationary satellite, wherein the determining uses predetermined limits based on a current location of the satellite in a non-geosynchronous orbit (NGSO) and the beam pattern of the satellite; and
        for each beam, adjust the current power level of the beam based on the determination, wherein the satellite controller is further configured to adjust the current power level of the beam by:
    attenuating the current power level of the beam when the total power exceeds the EPFD limit as an angle of transmission of the beam approaches a direction of transmission of the geostationary satellite;
    or
    increasing the current power level of the beam as the angle of transmission of the beam recedes from the direction of transmission of the geostationary satellite to a point of maximum power level that does not cause the total power to exceed the EPFD limit when the total power is below the EPFD limit.

12. The satellite of claim 11, wherein the EPFD limit is specified by the International Telecommunication Union (ITU) to prevent causing unacceptable interference to geostationary-satellite networks.

13. The satellite of claim 11, wherein the satellite controller is further configured to electronically steer the antenna to form the set of beams.

14. The satellite of claim 11, wherein the satellite controller is further configured to yaw steer the satellite to maintain the east to west orientation during orbit of the satellite.

15. The satellite of claim 11, wherein the satellite controller is further configured to rotate the antenna to maintain the east to west orientation during orbit of the satellite.

16. The satellite of claim 11, wherein each beam has substantially the same area.

17. The satellite of claim 11, wherein each beam is substantially elliptical in shape, wherein the first median of each beam is its minor axis and the second median of each beam is its major axis.

18. The satellite of claim 11, wherein each beam is substantially rectangular in shape.

19. A satellite comprising:
an antenna;
means for forming a beam pattern comprising a set of beams of the antenna of a satellite in a footprint of the satellite, each beam having a first median and a second median, each beam being narrow along its first median and wide along its second median, wherein the first medians are substantially collinear with each other and the second medians are substantially oriented east to west, wherein the satellite is a non-geostationary satellite and is part of a non-geostationary satellite system;
means for determining for each beam of the set of beams whether the beam at a current power level would result in a total power from the satellite at a geosynchronous orbit (GSO) exclusion zone on the Earth's surface to exceed an equivalent power flux density (EPFD) limit specified in relation to a geostationary satellite, wherein the determining uses predetermined limits based on a current location of the satellite in a non-geosynchronous orbit (NGSO) and the beam pattern of the satellite; and
for each beam, means for adjusting the current power level of the beam based on the determination, wherein the means for adjusting the current power level of the beam comprises:
means for attenuating the current power level of the beam when the total power exceeds the EPFD limit as an angle of transmission of the beam approaches a direction of transmission of the geostationary satellite;
or
means for increasing the current power level of the beam as the angle of transmission of the beam recedes from the direction of transmission of the geostationary satellite to a point of maximum power level that does not cause the total power to exceed the EPFD limit when the total power is below the EPFD limit.

20. The satellite of claim 19, wherein the EPFD limit is specified by the International Telecommunication Union (ITU) to prevent causing unacceptable interference to geostationary-satellite networks.

21. The satellite of claim 19, wherein the means for forming the beam pattern is configured to electronically steer the antenna to form the set of beams.

22. The satellite of claim 19, wherein the means for forming the beam pattern is configured to yaw steer the satellite to maintain the east to west orientation during orbit of the satellite.

23. The satellite of claim 19, wherein the means for forming the beam pattern is configured to rotate the antenna to maintain the east to west orientation during orbit of the satellite.

24. The satellite of claim 19, wherein each beam has substantially the same area.

25. The satellite of claim 19, wherein each beam is substantially elliptical in shape, wherein the first median of each beam pattern is its minor axis and the second median of each beam pattern is its major axis.

26. The satellite of claim 19, wherein each beam pattern is substantially rectangular in shape.

27. A non-transitory computer-readable media having stored instructions that when executed by a processor, the processor on board a satellite having an antenna, cause the processor to perform a method comprising:
forming a beam pattern comprising a set of beams of an antenna of a satellite in a footprint of the satellite, each beam having a first median and a second median, each beam being narrow along its first median and wide along its second median, wherein the first medians are substantially collinear with each other and the second medians are substantially oriented east to west, wherein the satellite is a non-geostationary satellite and is part of a non-geostationary satellite system;
determining for each beam of the set of beams whether the beam at a current power level would result in a total power from the satellite at a geosynchronous orbit (GSO) exclusion zone on the Earth's surface to exceed an equivalent power flux density (EPFD) limit specified in relation to a geostationary satellite, wherein the determining uses predetermined limits based on a current location of the satellite in a non-geosynchronous orbit (NGSO) and the beam pattern of the satellite; and
for each beam, adjusting the current power level of the beam based on the determination, wherein the adjusting the current power level of the beam comprises:
attenuating the current power level of the beam when the total power exceeds the EPFD limit as an angle of transmission of the beam approaches a direction of transmission of the geostationary satellite;
or
increasing the current power level of the beam as the angle of transmission of the beam recedes from the direction of transmission of the geostationary satellite to a point of maximum power level that does not cause the total power to exceed the EPFD limit when the total power is below the EPFD limit.

28. The non-transitory computer-readable media of claim 27, wherein the EPFD limit is specified by the International Telecommunication Union (ITU) to prevent causing unacceptable interference to geostationary-satellite networks.

29. The non-transitory computer-readable media of claim 27, wherein the antenna is an electronically steerable antenna.

30. The non-transitory computer-readable media of claim 27, wherein the forming uses yaw steering to maintain the east to west orientation during orbit of the satellite.

31. The non-transitory computer-readable media of claim 27, wherein the forming rotates the antenna to maintain the east to west orientation during orbit of the satellite.

32. The non-transitory computer-readable media of claim 27, wherein each beam has substantially the same area.

33. The non-transitory computer-readable media of claim 27, wherein each beam is substantially elliptical in shape, wherein the first median of each beam is its minor axis and the second median of each beam is its major axis.

34. The non-transitory computer-readable media of claim 27, wherein each beam is substantially rectangular in shape.

* * * * *